April 19, 1949. J. A. BOJE 2,467,654
DETACHABLE ROAD GRIP FOR VEHICLE TIRES
Filed Jan. 11, 1946
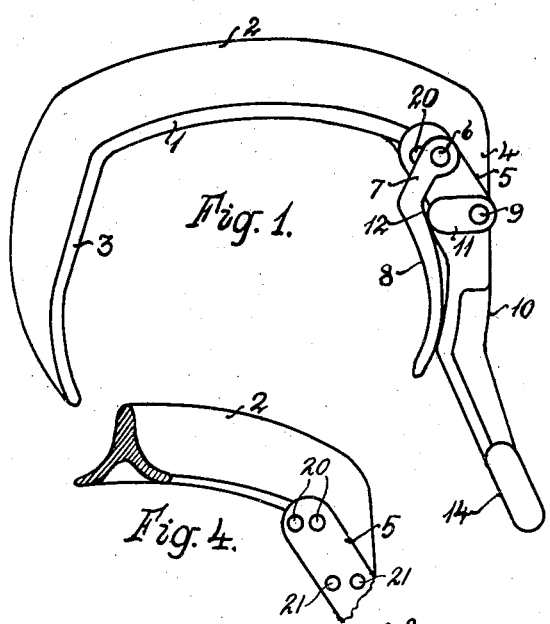
Fig. 1.
Fig. 4.
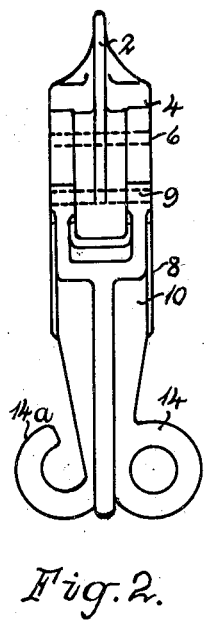
Fig. 2.
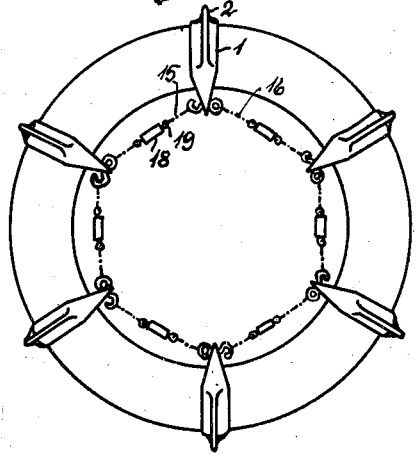
Fig. 3.
Inventor:
Jens Andreas Boje Patented Apr. 19, 1949

2,467,654

UNITED STATES PATENT OFFICE 2,467,654

DETACHABLE ROAD GRIP FOR VEHICLE TIRES

Jens Andreas Boje, Gentofte, Denmark, assignor to Aktieselskabet Terraincosyndikat, Copenhagen, Denmark Application January 11, 1946, Serial No. 640,438
In Denmark September 10, 1945

7 Claims. (Cl. 152—228)

The present invention relates to a detachable road grip for vehicle wheels with rubber tyres.

The object of the invention is to provide means for facilitating driving with motor cars through soft and yielding ground such as ploughed fields, swampy country and the like. It has formerly been proposed to provide the vehicle wheels with a number of road grips, for instance six, which preferably comprise a U-formed clamp with an outwardly extending ridge, the object of which is to prevent the wheel while rotating in slipping. These road grips are usually attached to the wheel by means of chains that are attached to radially extending arms connected to the grips.

The main drawback in connection with the hitherto known road grips of the kind mentioned is that they may only be firmly applied to a wheel corresponding in size exactly to the size of road grip. This is of minor importance when a set of grips are to be made for a certain type of wheels, but in cases where large numbers of grips are to be available for a great variation of wheel types, as the case will be for instance for military purposes, it is of great importance that any set of grips can be attached to any wheel so as to produce full effect, and it is absolutely necessary that the grip is firmly attached to the wheel in question.

The object of the present invention solves this problem by providing the road grip with means that allow its adjustment to any size in wheel width, and which means may be locked to provide a rigid connection with the wheel tyre surface.

A further object of the invention is to provide means for interconnecting a plurality of road grips arranged upon a wheel and for tightening these relatively, One manner of performing the invention is illustrated in the accompanying drawing, in which Fig. 1 is a front elevation of a road grip according to the invention, Fig. 2 a side elevation of same, Fig. 3 a side elevation of a vehicle wheel provided with six road grips, and Fig. 4 is a sectional view of a road grip.

In the manner of construction illustrated each road grip comprises a U-formed clamp 1, which along its outer surface is provided with a ridge 2. The inner branch 3 of the clamp is so long that it extends somewhat beyond the side of the wheel tyre, or at lease extends more than over half of the tyre side.

The outer branch 4 is quite shorter, and is provided with a reinforcement 5 that carries a pivot pin 6 for an arm 7, the depending end 8 of which is caved in such a manner that it fits snugly to the side of the wheel tyre when pressed against it.

The reinforcement 5 carries another pivot pin 9 for a locking member in the shape of a lever.

The arm 11 of this lever abuts a caved portion 12 formed on the outer side of the arm 7. To the lever 11 there is attached a depending arm 10 that is somewhat bent outwardly, and upon its lower end is provided on one side with an eye 14, and on the opposite side with a hook 14a. The object of this eye and hooks is explained later on.

The extreme end of the inner branch 3 of the clamp member is slightly curved in order to provide a firm hold against the wheel tyre.

When the road grip is to be attached to the wheel the clamp is placed transversely over the tyre, whereupon the arm 7 is pressed firmly against the tyre side by means of the lever 11, which is actuated by means of the operating arm 10. The point of abutment between the lever 11 and the depending arm 7, the caved portion 12, is so disposed that when the arm 10 is in its locking position, the said abutment point will lie somewhat displaced in relation to a line between the pivot pin 9 and the caved portion 12 to the effect that the device is self-locking.

When the number of road grips to be used, generally six, have been placed in position upon the wheel tyre, a chain 15 that is attached with its one end in each eye 14 is with its other end hooked into the hook 14a of the neighbouring grip, and by means of a turnbuckle 18 and screws 19 on the end of each chain part the connecting chains are tightened.

The eyes 14 and the hooks 14a on the operating arms 10 are so positioned in relation to each other that a plane through the said eyes and hooks will lie outside a plane through the pivots 9 to the effect that in the eyes and the hooks there is brought about a force that acts parallel to the wheel axis towards the wheel centre, and this again ensures that the operating arm 10 acts as intended.

The manner of construction illustrated is only to be considered an example, and the details of construction may be varied within the scope of the invention. It is thus possible to provide the branch 4 of the clamp, or its reinforcement 5, with two or more holes 20 for the pivot pin 6, as likewise there may be arranged several other holes 21 for the pivot pin 9 to the effect that the clamp may be adjusted to wheel tyres of considerable variations in width, as by means of these holes it is possible to alter the span of the clamp.

It is possible to omit the chains 15 if the operating arm 10, or the lever 11, is provided with a latch device, that engages an incision in the cooperating member to prevent their disengagement before the latch is released.

The shape of the clamp, as well as the shape of the ridge may be any other than that shown, but the form illustrated in Fig. 4 has been found to be most effective. It will be noted that the ridge in section is V-shaped with curved walls, so that earth or the like that adheres to the ridge may easily slide off again.

I claim:

1. A detachable road grip for a vehicle wheel with a rubber tire comprising in combination a substantially U-shaped body with rigid side arms; a clamp member pivotally attached to one of said rigid side arms; a double armed lever pivotally attached to the same rigid side arm as said clamp member and adapted to cooperate with the same as to force said clamp member against the rubber tire of the wheel when turned in a slightly outwardly pointing position; connecting means mounted on said double armed lever and adapted to be connected with double armed levers of other detachable road grips mounted on said wheel so as to force said levers in said slightly outwardly pointing position thereby firmly holding said road grips on said rubber tire.

2. A detachable road grip for a vehicle wheel equipped with a rubber tire comprising in combination a substantially U-shaped body including an inner and an outer side arm; a clamp member pivotally attached to said outer side arm; a double armed lever pivotally attached also to said outer side arm and adapted to press with one of its lever arms against said clamp member forcing the same against said rubber tire of said wheel when said double armed lever is turned into a position in which its other lever arm is in a slightly outwardly pointing position; connecting means mounted on said other lever arm of the said double armed lever and adapted to connect said other lever arm of said double armed lever with the other lever arms of other double armed levers of other detachable road grips mounted on the same wheel so as to hold all said other lever arms in said slightly outwardly pointing position thereby firmly holding said road grips on said rubber tire.

3. A detachable road grip for a vehicle wheel equipped with a rubber tire comprising in combination a substantially U-shaped body including an inner and an outer side arm; a clamp member pivotally attached to said outer side arm; a double armed lever pivotally attached also to said outer side arm and adapted to press with one of its lever arms against said clamp member forcing the same against said rubber tire of said wheel when the other lever arm of said double armed lever is turned against said wheel; connecting means mounted on said other lever arm of said double armed lever and adapted to connect said double armed lever with the double armed levers of other detachable road grips mounted on the same wheel so as to turn all of them against said wheel thereby firmly holding said road grips on said rubber tire.

4. A detachable road grip for a vehicle wheel equipped with a rubber tire comprising in combination a substantially U-shaped body including an inner and an outer side arm; a clamp member pivotally attached to said outer side arm; a double armed lever pivotally attached also to said outer side arm and adapted to press with one of its lever arms against said clamp member forcing the same against said rubber tire of said wheel when the other lever arm of said double armed lever is turned against said wheel; connecting means mounted on said other lever arm of the said double armed lever and adapted to connect said other lever arm of said double armed lever with the other lever arms of other double armed levers of other detachable road grips mounted on the same wheel so as to turn said other lever arm of said double armed levers against said wheel thereby firmly holding said road grips on said rubber tire.

5. A detachable road grip for vehicle wheels with rubber tires, comprising a substantially U-shaped body with rigid side arms one of which is shorter than the other, a pivot pin traversing the said shorter side arm at some distance from the end thereof, a downwardly extending clamp member pivotally attached to the said pivot pin and provided with a caved in abutment surface on its exterior edge, a fulcrum pin traversing the extreme end of the said shorter side arm, and a bell crank lever having a short arm abutting the said caved in abutment surface of the clamp member, and a long operating arm.

6. A detachable road grip for vehicle wheels with rubber tires, comprising a substantially U-shaped body with rigid side arms one of which is shorter than the other, a pivot pin journalled in one of a plurality of interspaced holes formed in the short side arm at some distance from the end thereof, a downwardly extending clamp member having a caved in abutment surface formed on its exterior edge, a fulcrum pin journaled in one of a plurality of interspaced holes formed in the extreme end of the short side arm, a bell crank lever rotatable on the said fulcrum pin and having a short arm abutting the caved in abutment surface of the clamp member, and a long outwardly bent operating arm, and a hook and an eye member attached to opposite sides of the operating arm disposed outside a vertical plane through the fulcrum pin.

7. A road grip device for a vehicle wheel with rubber tires comprising a plurality of grip members, each member comprising a substantially U-shaped body with rigid side arms, one of which is shorter than the other, a pivot pin traversing the shorter side arm at some distance from the end thereof, a downwardly extending clamp member having a caved in abutment surface on its outer edge pivotally attached to the pivot pin, a fulcrum pin traversing the extreme end of the short side arm, a bell crank lever rotatably mounted on the fulcrum pin and having a short arm abutting the caved in abutment surface of the clamp member, and a long outwardly bent operating arm, a hook member and an eye member formed on opposite sides of the operating arm and disposed outside the vertical plane through the fulcrum pin, a connecting link attached to the hook member of each grip member, a turnbuckle attached by its one end to the free end of each of the said connecting links, and another connecting link attached to the other end of the turnbuckle and to the eye member of the next grip member in succession.

JENS ANDREAS BOJE.

REFERENCES CITED

The following references are of record in the file of this patent:

UNITED STATES PATENTS

| Number | Name | Date |
|---|---|---|
| 1,256,538 | Eichner | Feb. 19, 1918 |
| 1,371,956 | Warren | Mar. 15, 1921 |
| 2,119,447 | Stahl et al. | May 31, 1938 |
| 2,154,047 | Krider | Apr. 11, 1939 |

FOREIGN PATENTS

| Number | Country | Date |
|---|---|---|
| 816,343 | France | Aug. 5, 1937 |